United States Patent [19]

Greve

[11] Patent Number: 5,594,989
[45] Date of Patent: Jan. 21, 1997

[54] PROCESS FOR MAKING JEWELRY UTILIZING A HARD PHOTOPOLYMER

[75] Inventor: Donald W. Greve, Sunrise, Fla.

[73] Assignee: Aurafin Corporation, Sunrise, Fla.

[21] Appl. No.: 416,049

[22] Filed: Apr. 4, 1995

[51] Int. Cl.$^6$ .............................. B21F 43/00; B22C 9/02; C08J 7/04
[52] U.S. Cl. ............................ 29/896.4; 164/35; 427/510; 430/320
[58] Field of Search ................................ 29/160.6, 896.4; 164/34, 35, 45; 427/510; 430/320

[56] References Cited

U.S. PATENT DOCUMENTS

| | | | |
|---|---|---|---|
| 3,659,327 | 5/1972 | Beverick et al. | 29/896.41 |
| 4,844,144 | 7/1989 | Murphy et al. | 164/35 |
| 5,152,042 | 10/1992 | Mayers | 29/160.6 |
| 5,351,378 | 10/1994 | Hsien-Chung | 29/160.6 |

FOREIGN PATENT DOCUMENTS 1102092  6/1981  Canada .................... 22/158

Primary Examiner—P. W. Echols
Attorney, Agent, or Firm—Malin, Haley, DiMaggio & Crosby, P.A.

[57] ABSTRACT

The instant invention contemplates a process for manufacturing jewelry including the steps of: (a) creating a photographic negative from a computer-generated image; (b) masking the negative over a photopolymerizable resin backed by a rigid substrate; (c) irradiating the unmasked resin with ultraviolet radiation; (d) removing the unpolymerized resin from the photopolymer, using a washing agent such as water, resulting in a positive three-dimensional likeness of the object to be cast; (e) placing the resulting etched resin plate into a container and pouring tooling resin into the container thereby creating a plug bearing the negative impression of the jewelry item to be created; (f) inserting the tooling resin plug into a jewelry item mold having an empty sleeve which receives the plug resulting in a completed jewelry mold; (g) filling the completed mold with plastic resulting in a plastic model of the jewelry item to be created; (h) using the plastic model in a "lost wax" casting process to create an individual jewelry item.

9 Claims, 1 Drawing Sheet

1

PROCESS FOR MAKING JEWELRY UTILIZING A HARD PHOTOPOLYMER

BACKGROUND OF THE INVENTION

1. Field of the Invention

This invention relates to a process and apparatus for manufacturing individual items such as pieces of jewelry having a personalized message, or design, as part of the jewelry in either prominently embossed or in sharply sunken features. More particularly, this invention relates to a jewelry manufacturing process and apparatus utilizing photopolymerizable resin backed by a rigid substrate for creating a plug comprising a multi-level partial mold, for use in combination with other molds, in a "lost wax" type casting process.

2. Description of the Prior Art

Personalized jewelry bearing the wearer's name or other message are popular products. An example of such a jewelry item may be a high school class ring identifying a social affiliation, date of graduation, and the name of the high school mascot. Other such jewelry items could include pendants, charms, name tag bracelets and the like. Although such jewelry items have been available in the past, they have been available with only a limited selection in the style, or letter font, and in many cases long names or unusual names were not possible in an attractive form. These limitations on the availability of personalized jewelry are mainly due to the lack of a convenient and inexpensive method of manufacturing such jewelry. The methods of manufacturing personalized jewelry which are presently available have limited flexibility, are labor intensive, and produce results with limited eye appeal.

These prior methods include hand and machine engraving. Hand engraving, of course, required a skilled artisan and the results were limited by his or her ability. Although machines are commonly available to engrave letters, these machines frequently included a pantograph arrangement that operated off preformed letters on a die. Only the simplest letter styles were possible, and the selection of letter designs was extremely limited. The letters frequently had to be spaced and arranged individually by hand on the jewelry item. In addition, in both hand and machine engraved jewelry, only a very shallow message is possible without great expense and the shallow message is not as appealing to the eye or as durable as the personalized jewelry which can be manufactured using the method of my invention.

Die striking is another method of providing personalized messages on jewelry. In this method, the letters are impressed into the jewelry item by striking the jewelry with a hardened steel die to form the letters. This method either requires a specific die to be made for each name or requires the message to be reproduced letter by letter. Because of the expense of making special dies for specific names, this method is reasonably applicable with only common first names. In addition, with this method, only a limited selection of letter styles is available. As with the engraving method only a shallow recessed message is available and the method does not provide the deeply sunken and attractive name or message available with my invention.

Another method used currently is the injection molding of individual letters in plastic which are placed individually by hand in a specific slot in the wax pattern that is used to make the mold for casting the jewelry item by the lost wax process. This method requires the message to be assembled by hand on each individual wax pattern from the letters available and does not permit a collection of patterns for common names to be reused a multiplicity of times, which would reduce the cost of manufacture of subsequent jewelry items. Furthermore, this method requires molds which are costly for use in injection molding machines to form the individual letters.

Canadian Patent No. 1,102,092 introduces into the investment casting or lost wax process of manufacturing jewelry the manufacture of inserts for a master die or wax pattern with multi-level alphabet messages using the output of a conventional typewriter to photo-etch names, messages and designs.

The Canadian patent discloses preparing a plurality of personal messages to be included on individual pieces of jewelry, photographing the plurality of personal messages and making a photographic negative with an image of the messages, using the photographic negative and a source of radiation to polymerize a photopolymerizable resin carried on a rigid substrate and removing the unpolymerized photopolymerizable resin from the substrate to form the plurality of personalized messages, placing a plurality of insert forming rings about each personalized message, filling the rings with a fluid casting material, curing the fluid casting material within the rings to form a plurality of solid inserts, placing each insert in a master die and injecting the master die with wax to make a wax likeness of the jewelry bearing the personalized message, and using the wax likeness to form the cavity of a mold in which the personalized jewelry is to be cast by the lost wax process. The Canadian patent does not contemplate removing the unpolymerized photopolymerizable resin from the substrate in stages using a blocking agent and resulting in multi-level personalized messages.

U.S. Pat. No. 4,444,607 issued to Lash et al., discloses a process for molding a three dimensional decorative article which includes electronically generating a line drawing of an article and electronically displaying the drawing, photographing the drawing thereby creating a transparency, positioning the transparency over a layer of liquid photopolymer, exposing the photopolymer through the transparency to a burst of radiation to set the photopolymer, and removing the remaining liquid to form a three dimensional article. Using a liquid photopolymer in jewelry manufacturing, however, is not practical due to the unique machinery and manufacturing methods employed in this highly specialized industry.

U.S. Pat. No. 4,889,666, issued to Kawasaki, discloses a METHOD FOR PRODUCING CONCRETE PRODUCTS PROVIDED WITH INLAID PATTERNS whereby a reusable mold with recessed patterns is produced by emitting ultraviolet rays on opposing surfaces of an ultraviolet setting masked resin, and using the resulting three-dimensional form in a "lost-wax" type casting operation. However, this disclosure requires extra steps of irradiating the photopolymer from both sides to produce a reusable mold, and creating a "waste" mold from the reusable mold.

U.S. Pat. No. 3,659,327, issued to Beverick et al., teaches the manufacture of jewelry depicting various scenes or figures by creating a negative of an image, placing the negative on a zinc plate by photoengraving, creating an impression in a conventional rubber-based impression material thereby producing a reverse or negative impression of the image, filling the impression with wax to form a likeness of the finished casting, investing the wax likeness into a casting ring filled with high heat plaster, and heating the plaster whereby the wax is burned off leaving a plaster mold into which a gold article may be cast. Beverick, however, requires the additional step of manufacturing a wax mold in lieu of using the initial photoengraved material to create a final mold.

Thus there exists a need for a jewelry manufacturing process whereby a photographic negative is produced from a computer-generated image, the negative is used to mask "hard" photopolymerizable resin, backed by a rigid substrate, which is exposed to ultraviolet radiation thereby producing a multi-level positive three-dimensional likeness of the object to be cast, creating a negative mold of the image for use as an insert plug in combination with other molds having apertures formed therein for receiving said plugs thereby creating a complete mold of a finished jewelry item.

SUMMARY OF THE INVENTION

The instant invention overcomes the aforementioned limitations currently present in the art and contemplates a process for manufacturing jewelry including the steps of: (a) creating a photographic negative from a computer-generated image; (b) masking the negative over a photopolymerizable resin backed by a rigid substrate; (c) irradiating the unmasked resin with ultraviolet radiation; (d) partially removing the unpolymerized photopolymerizable resin from the rigid substrate in stages, using a washing agent such as water, and a water insoluble blocking agent, resulting in a positive multi-level three-dimensional likeness of the object to be cast; (e) placing the resulting etched resin plate into a container and pouring tooling resin into the container thereby creating a plug bearing the negative impression of the jewelry item to be created; (f) inserting the tooling resin plug into a jewelry item mold having an empty sleeve which receives the plug resulting in a completed jewelry mold; (g) filling the completed mold with plastic resulting in a plastic model of the jewelry item to be created; (h) using the plastic model in a "lost wax" casting process to create an individual jewelry item.

In accordance with the present invention, it is an object hereof to provide a jewelry manufacturing process for producing multi-dimensional personalized jewelry from a computer generated image utilizing a photopolymerizable resin backed by a rigid substrate.

Still another object of the instant invention is to provide a jewelry manufacturing process whereby a photographic negative is used in masking a photopolymerizable resin sheet backed by a rigid substrate, which is subsequently irradiated causing the unmasked areas to cross-link, thereby creating personalized jewelry mold plugs bearing a negative three-dimensional impression.

A further object of the instant invention is to provide a jewelry manufacturing process whereby a personalized jewelry plugs bearing negative impressions are used in creating jewelry mold plugs for use in combination with jewelry molds for forming a completed jewelry mold.

In accordance with these and other objects which will become apparent hereinafter, the instant invention will now be described with particular reference to the accompanying drawings.

DESCRIPTION OF THE PREFERRED EMBODIMENTS

Figure 1:
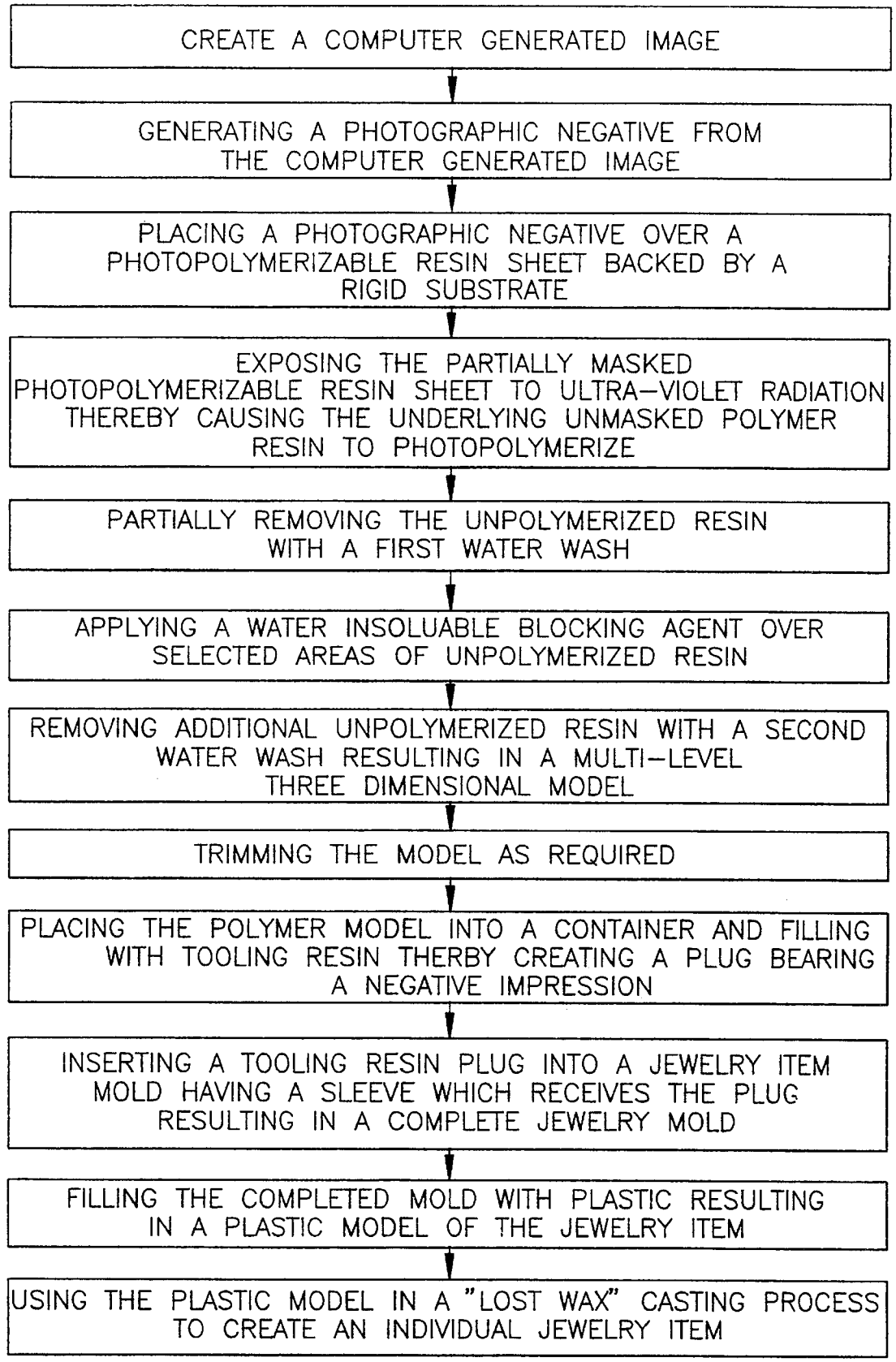
FIG. 1 is a flow chart describing the photopolymer jewelry process of the instant invention

FIG. 1 depicts a flow chart of the steps contemplated by the instant invention. The "Hard Polymer Process" of the present invention is a process for creating customized, mass-produced, articles such as jewelry items according to the following steps: (a) Creating a computer generated image; (b) Generating a photographic negative from the computer generated image; (c) Placing the photographic negative over a photopolymerizable resin sheet backed by a rigid substrate; (d) Exposing the partially masked photopolymerizable resin sheet to ultra-violet radiation thereby causing the underlying unmasked polymer resin to cross-link; (e) Removing layers of the unpolymerized photopolymerizable resin in stages with a water wash and a blocking agent, resulting in a multi-level three dimensional polymer resin model; (f) Trimming the model as required (optional); (g) placing the polymer resin model into a container and pouring tooling resin into the container thereby creating a plug bearing the negative impression of the jewelry item to be created; (h) inserting the tooling resin plug into a jewelry item mold having an empty sleeve which receives the plug resulting in a completed jewelry mold; (i) filling the completed jewelry mold with plastic resulting in a plastic model; (j) using the plastic model in a "lost wax" casting process to create an individual jewelry item.

Thus, practicing the process taught by the present invention contemplates the creation of a computer generated image. The image may consist of an alpha-numeric string, or pictorial artwork. The creation of the desired image may be aided by appropriate computer hardware, such as an IBM® PC; and software, such as Autocad®, Coreldraw®, or any other suitable software. In addition, existing designs may be copied and digitally scanned into computer memory with the use of a scanner, and subsequently modified if desired. A laser printer capable of 600 DPI output produces camera ready art. Once reduced to final form, a photographic negative of the image, from any available source, is generated by any of the known graphic arts methods.

The process next requires the selection of a proper photopolymer. There are several commercially available photopolymers which are primarily used as printing plates. These include: rubber like, polyester backed, sheets in thicknesses of 0.045 inches, 0.067 inches, 0.090 inches, and 0.110 inches; liquid polymers that can be rolled to a desired thickness and cured to a rubber like consistency; hard polymers of a wide variety of thicknesses having aluminum or steel plate backing; and, hard polymers of varying thickness having polyester backing. The instant invention contemplates utilizing a hard polymer backed by a rigid substrate as manufactured by Anderson and Vreeland Midwest, Inc., of Bryan, Ohio, designated as model MLD.

The polymer plates consist of a cover film, a photosensitive layer, and adhesive layer, and a rigid backing of Aluminum or Steel. The plates range in thickness from 0.051 inches to 0.138 inches and have a relief depth ranging from 0.039 inches to 0.114 inches.

First, the plate backing is exposed to ultraviolet radiation for several seconds, usually from a mercury vapor source, thereby causing a portion of the photopolymer to cross-link, or photo-set, to a predetermined depth. The exposure time establishes the "floor" depth for purposes of setting the available relief depth, i.e. the longer the exposure the thicker the floor and hence the thinner the available relief for a given thickness sheet.

Next, the previously generated negative is placed over the front of the photopolymer and the negative is covered by a clear plastic protective sheet. A vacuum is drawn by the plate maker machine to insure complete contact between the negative and the underlying photopolymer. The plate is then exposed for several minutes, depending on the desired relief, to the same mercury vapor ultraviolet light source. The negative functions to mask the underlying photopolymer thereby selectively allowing the cross-linking reaction to take place in the unmasked plate areas. It has been found that a metal halide ultraviolet light source produces the sharpest image, a particularly desirable characteristic for jewelry manufacturing, since the bulb is typically unfrosted and thus does not diffuse the light rays to the extent that a frosted mercury vapor bulb does.

After exposure, the plate is subjected to a water wash. As a result, the unexposed areas of the photopolymer are dissolved leaving the exposed (cross-linked) polymer image raised on the plate. The wash process is accomplished in either a flat or rotary wash unit with water at a temperature of between 95 and 104 degrees Fahrenheit. The raised areas do not dissolve or wash away because exposure to ultraviolet radiation causes the polymer to cross-link or polymerize thereby causing a distinct change in state.

It has been found that selectively stopping the water wash process, before the unexposed areas are fully dissolved, and blocking selected unexposed areas with a water insoluble substance, allows for the production of plates having multi-level relief features. Thus, the instant invention contemplates a first wash stage wherein a layer of unpolymerized photopolymerizable resin is removed. The first wash stage is followed by the application of a water insoluble blocking agent over selected areas of unpolymerized resin. The water insoluble blocking agent bonds to the resin and protects the underlying unpolymerized resin from being washed away. Next a second washing stage removes an additional layer of resin, which second stage may be followed by a second application of water insoluble blocking agent. This process, washing to remove a layer of unpolymerized resin followed by the application of a water insoluble blocking agent, is repeated as often as is desired and results in multi-level relief thus allowing for greater artistic expression than do prior art methods.

The plate should be dried in an air circulating dryer at a temperature of 194–212 degrees Fahrenheit. Drying time ranges from 30 to 45 minutes. The raised designs existing on the plate may then be trimmed if necessary, using a trimming tool to remove any excess or unwanted polymer.

The polymer plate having an embossed or raised multi-level design is then placed into a container and tooling resin added and allowed to set thereby creating a plug bearing a negative impression of the design. The tooling resin plug is then inserted into a jewelry mold having a sleeve for receiving the plug such that insertion of the plug(s) completes the mold. The completed mold is then filled with wax which is allowed to set thereby forming a plastic model of the jewelry item. This model is used in a "lost wax" casting process to create an individual jewelry item incorporating the aforementioned multi-level design.

It should be apparent that economy of scale may be maximized by incorporating a large number of individual designs on a single photographic negative thereby producing multiple polymer resin models using a single photopolymer sheet.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:
1. A process for producing customized, three dimensional articles, including the following steps:
   (a) creating a computer generated image;
   (b) generating a photographic negative from the computer generated image;
   (c) placing the photographic negative over a photopolymerizable resin sheet backed by a rigid substrate so that said photopolymerizable resin sheet is partially masked and partially unmasked;
   (d) exposing the partially masked photopolymerizable resin sheet to ultra-violet radiation thereby causing the underlying unmasked photopolymerizable resin to cross-link;
   (e) removing a layer of unpolymerized photopolymerizable resin with a liquid wash, followed by selectively blocking remaining areas of unpolymerized resin with a water insoluble agent, and removing additional polymer resin with a water wash, resulting in a multi-level relief polymer resin model;
   (f) trimming the model as required;
   (g) placing the polymer resin model into a container and pouring tooling resin into the container thereby creating a tooling resin plug bearing the negative impression of the item to be created;
   (h) inserting the tooling resin plug into a mold having an empty sleeve which receives the plug resulting in a completed mold;
   (i) filling the completed mold with plastic resulting in a plastic model;
   (j) using the plastic model in a lost wax type casting process resulting in a solid three dimensional article.

2. A process for producing customized, three dimensional articles, according to claim 1, wherein said three dimensional article is jewelry.

3. A process for producing customized, three dimensional articles, according to claim 1, wherein said three dimensional article is a toy.

4. A process for producing customized, three dimensional articles, according to claim 1, wherein said three dimensional article comprises a decorative metallic insert for use with other items of manufacture.

5. A process for producing customized, three dimensional articles, according to claim 1, wherein said computer generated image is created using image generating computer software.

6. A process for producing customized, three dimensional articles, according to claim 1, wherein said photopolymerizable resin sheet backed by a rigid substrate has a thickness between 0.045 inches and 0.110 inches.

7. A process for producing customized, three dimensional articles, according to claim 1, wherein said ultraviolet radiation is generated by a metal halide ultraviolet light source.

8. A process for producing customized, three dimensional articles, according to claim 1, wherein said liquid wash is comprised of a solution including water.

9. A process for producing customized, three dimensional articles, according to claim 1, wherein removing unpolymerized resin further includes the step of forced air drying with air at an elevated temperature.

* * * * *